(12) United States Patent
Ottowitz

(10) Patent No.: US 6,213,088 B1
(45) Date of Patent: Apr. 10, 2001

(54) METHOD AND DEVICE FOR OPERATING AN INTERNAL COMBUSTION ENGINE

(75) Inventor: Alfred Ottowitz, Reichertshofen (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 09/424,517

(22) PCT Filed: May 18, 1997

(86) PCT No.: PCT/EP98/02907

§ 371 Date: Nov. 23, 1999

§ 102(e) Date: Nov. 23, 1999

(87) PCT Pub. No.: WO98/54444

PCT Pub. Date: Dec. 3, 1998

(30) Foreign Application Priority Data

May 26, 1997 (DE) .............................................. 197 21 933

(51) Int. Cl.$^7$ .............................. F02B 5/02; F02M 45/02
(52) U.S. Cl. ........................................................... 123/299
(58) Field of Search ................................... 123/299, 295, 123/305

(56) References Cited

U.S. PATENT DOCUMENTS 5,482,017 * 1/1996 Brehob et al. ...................... 123/299
6,032,641 * 3/2000 Aketa et al. ......................... 123/299
6,112,716 * 9/2000 Tachibana ............................ 123/299
6,125,816 * 10/2000 Inoue ................................... 123/299

FOREIGN PATENT DOCUMENTS

| 4139291 | 6/1993 | (DE) . |
| 4439573 | 5/1996 | (DE) . |
| 1962283 | 12/1996 | (DE) . |
| 0621400 | 4/1994 | (EP) . |
| WO9711269 | 4/1996 | (WO) . |

* cited by examiner

*Primary Examiner*—Erick Solis
(74) *Attorney, Agent, or Firm*—Lalos & Keegan; Michael N. Lau

(57) ABSTRACT

The invention relates to a method for improving the thorough mixing of the exhaust gas/fuel mixture in an internal combustion engine (1), whereby the exhaust gas stream is at least temporarily impinged upon by an increased exhaust-gas mass flow when additional fuel is supplied. According to said method, during the exhaust stroke, when the exhaust valve (8) or exhaust valves are open, the additional fuel is fed directly into the combustion chamber of the internal combustion engine (1). The invention also provides for a device to carry out said method, according to which the additional fuel is injected during the exhaust stroke when the exhaust valve (8) or exhaust valves (8) are open by means of at least one injection nozzle (10) positioned in the combustion chamber. Both the method and the device are especially simple and cost-efficient.

12 Claims, 1 Drawing Sheet

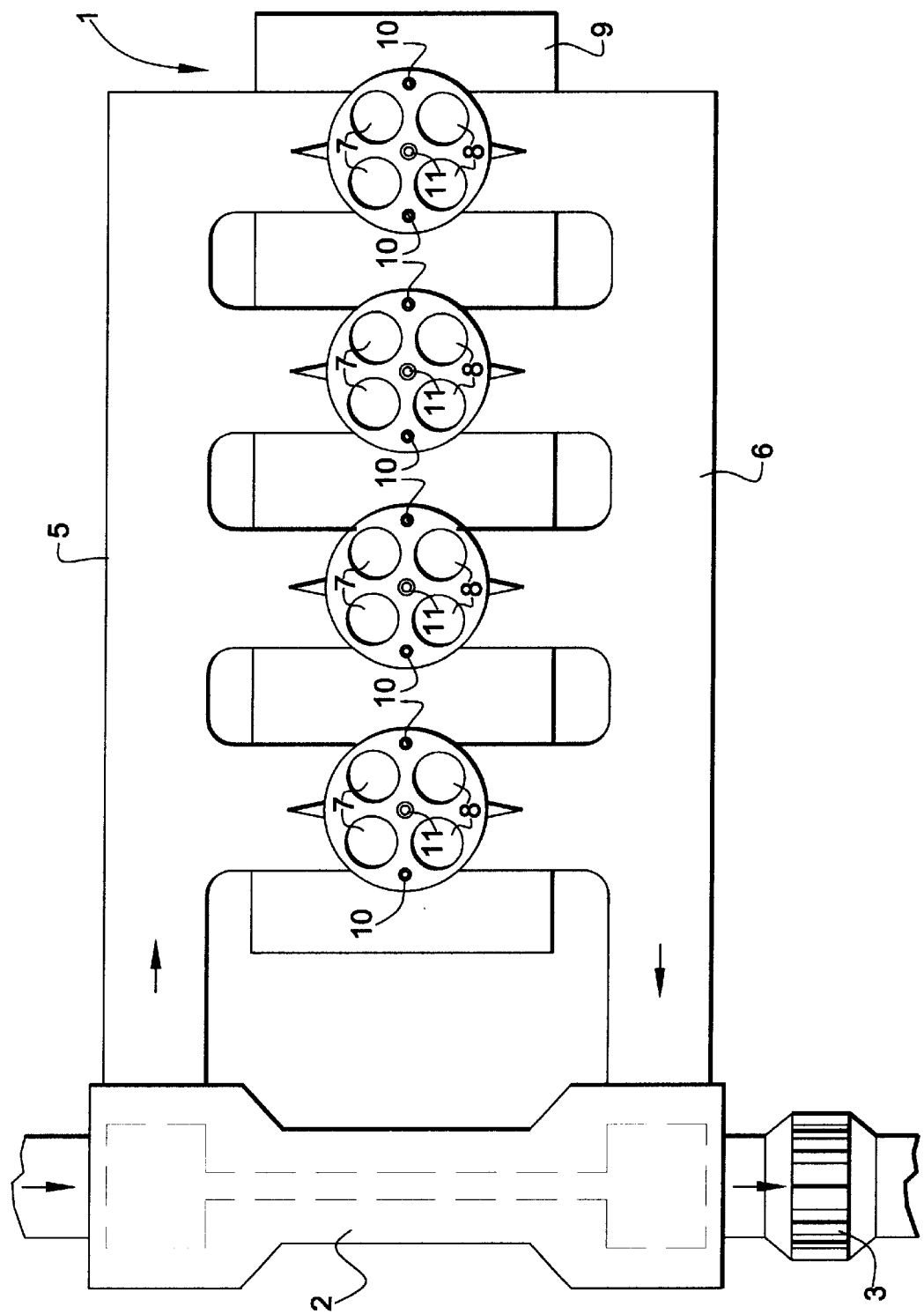

METHOD AND DEVICE FOR OPERATING AN INTERNAL COMBUSTION ENGINE

This invention relates to a process and a device for operation of an internal combustion engine in which an increased exhaust gas mass flow acts at least temporarily on the exhaust gas stream.

A process such as this and a device for application of the process are disclosed in German publication DE 41 39 291 A1, for example. In this process, in order to achieve improved exhaust gas decontamination and faster acceleration of the exhaust gas turbine in the area of the exhaust gas manifold, an increased amount of fuel is delivered which is spark ignited a short distance upstream from the gas turbine. This process and the device applying it do, however, present the disadvantage that the additional fuel cannot be distributed in the exhaust gas with adequate efficiency and that costly mechanisms for delivery and ignition of the additional fuel must be provided in the exhaust gas stream.

In addition, publications WO 96/03572 and DE 196 22 832 A1 describe a process and a device for increasing the efficiency of a catalytic converter in a diesel engine in which secondary injection must be carried out in addition to the primary injection during the exhaust stroke of the engine. The additional fuel is introduced in this case by the engine fuel injection device into the cylinders and ignites spontaneously in the latter.

It is the object of this invention to develop the state-of-the-art processes so as to permit improved intermixture and simplified ignition of the fuel-exhaust gas mixture. An additional object is provision of a device for application of the process developed.

The object claimed for the process is attained by means of the features described in claim 1. Better intermixture of additional fuel with residual gas is accomplished by supply of additional fuel during the exhaust cycle with the exhaust valve or valves open, directly into the combustion chamber of the internal combustion engine filled with residual gas, since the optimized geometries present in the combustion chamber may be used for this purpose. As a result of the improved intermixture, the pressure and the temperature of the exhaust gas of the additional fuel and the residual gas are improved in such a way that the response characteristic of an exhaust gas turbine is distinctly improved. In addition, a catalytic converter optionally provided in the exhaust gas stream can, as a result of increase in pressure and temperature of the exhaust gas, reach its operating temperature more quickly and retain this temperature even under unfavorable conditions. Such unfavorable conditions exist in particular during overrunning operation of the internal combustion engine, since normal fuel delivery is then discontinued, as a result of which there is a risk both of drop in the speed of the exhaust gas turbine and of lowering of the temperature of the catalytic converter. And, because the additional fuel is spark ignited, afterburning of the additional fuel is ensured in any event.

By preference delivery of additional fuel takes place before the piston of the internal combustion engine reaches the gas exchange upper dead center (OT=oberer Totpunkt). As a result, sufficient time still remains for intermixture of the additional fuel with the residual gas and for the mixture to leave the combustion chamber through the opened discharge valve. If, on the other hand, the additional fuel has already burned before the piston reaches the gas exchange OT, this even causes a slight delay of the piston stroke. In theory delivery of additional fuel in a crankshaft angle range of approximately 120 to 380 degrees beyond the ignition OT is conceivable.

Additional fuel should be delivered with intake valves closed. In this way the mixture of additional fuel and residual gas cannot reach the intake stream of the internal combustion engine, as a result of which the efficiency of the internal combustion engine would be impaired. In addition, the time of opening of the intake valves of the internal combustion engine may be displaced in the direction of "retarded" at least temporarily, that is, during delivery of additional fuel. The reason is that this has the effect of lengthening the interval between opening of the discharge valve and opening of the intake valve, so that more time is accordingly available for delivery of the additional fuel and intermixture of the additional fuel with the residual gas.

The additional fuel is injected in a suitable manner during the cold operation stages, the acceleration stages, and/or with the internal combustion engine under low load, that is, in overrunning operation as well. Improvement in the response characteristic of the exhaust gas turbine, as well as faster heating or constant heating of the exhaust gas catalytic converter, are, after all, desirable especially under these operating conditions.

The residual gas in the combustion chamber of the internal combustion engine should have excess air immediately before delivery of the additional fuel, so that additional fresh air need not be delivered by another route for afterburning of the mixture of additional fuel and residual gas. For example, the throttle valve, open during overrunning, could be closed on the basis of the speed of the internal combustion engine in order to obtain residual gas with sufficient excess air.

Additional fresh air could, of course, also be delivered by another route for the afterburning. For example, fresh air from the intake stream could be diverted and introduced into the exhaust gas stream as close as possible to the combustion chamber upstream from the closed throttle valve during overrunning operation. Delivery of additional fresh air could in the process be controlled on the basis of the intake pressure of the exhaust gas turbine, the speed of the internal combustion engine, and/or the time derivative of engine speed (acceleration or retardation).

The amount of additional fuel is determined in the process claimed for the invention on the basis of the excess air in the amount of residual gas and/or the amount of additional fuel delivered.

The object claimed for the device is attained by the features described in claim 9. Through injection of the additional fuel by means of at least one injection nozzle mounted in the combustion chamber, the direct-injection nozzles by definition present in the combustion chamber of Otto internal combustion engines may be used, so that no additional mechanisms are required for delivery of the additional fuel. In addition, the electronic drive unit already present may be used for the injection nozzles.

Preferably at least one injection valve is mounted on the cylinder head side in the internal combustion engine for injection of additional fuel. Consequently, additional fuel may be delivered by an especially advantageous method also a short time before the piston of the internal combustion engine reaches the gas exchange OT.

It is claimed for the device that residual gas with a great amount of excess air can be provided and/or fresh air can be diverted from the intake upstream of a throttle valve and injected into the exhaust gas stream as close as possible to the combustion chamber so that reliable afterburning is ensured.

In an advantageous embodiment of this invention, external ignition of the mixture of additional fuel, residual gas, and/or additional fresh air is effected by means of at least one ignition plug mounted in the combustion chamber of the internal combustion engine. Consequently, at least the ignition plug by definition present in Otto internal combustion engines may be used, so that no other mechanisms are required for ignition of the additional fuel. In this instance as well the electronic triggering unit for the ignition plugs already present may be used.

It is especially preferable to have at least the single ignition plug mounted in the combustion chamber for external ignition of the mixture of additional fuel, residual gas, and additional fresh air on the cylinder head side.

This invention is described in detail with reference to the following drawing.

The FIGURE of the drawing shows a diagrammatic representation of a four-cylinder reciprocating internal combustion engine 1 with a turbocharger 2 and catalytic converter 3.

The four cylinders 4 of the internal combustion engine 1 are adjacent on the intake side to an intake distributor 5 and on the discharge side to an exhaust gas manifold 6.

Two intake valves 7 and two discharge valves 8 are assigned to each cylinder 4 for charge changing. These valves 7, 8 are mounted in the cylinder head 9 of the internal combustion engine 1. Also mounted in the cylinder head 9 of the internal combustion engine 1 are, for example, two injection nozzles 10 and one spark plug 11 per cylinder 4. These injection nozzles 10 are mounted symmetrically on both sides of the spark plugs 11, in the center of the cylinders 4, between the intake valves 7 and the discharge valves 8.

The internal combustion engine 1 operated by the four-cycle process in normal operation uses the two injection nozzles 10 present for direct injection of Otto fuel and the spark plug 11 for ignition of the mixture of fuel and fresh gas formed in the combustion chamber of the internal combustion engine 1.

The discharge cycle begins after ignition and burning of the fuel and fresh gas mixture, the two intake valves 7 being closed and the two discharge valves 8 being open. During the discharge cycle, shortly before the piston, not shown, of the internal combustion engine 1 reaches its upper dead center (OT), one or both of the injection nozzles 10 inject(s) a small amount of additional fuel into the combustion chamber in the cylinder 4, which fuel spontaneously ignites because of the excess air in the hot residual gas or is simply spark ignited by an additional spark of the spark plug 11.

The afterburning mixture of additional fuel and residual gas is then displaced past the open discharge valves 8 into the exhaust manifold 6, such displacement being supported by the further movement of the piston toward the upper dead center (OT).

To prevent the mixture of additional fuel and residual gas from also moving past the intake valves 7 to reach the intake distributor 5, the actuating times are set so that the opening periods of the intake valves 7 and the discharge valves 8 do not overlap during injection of the additional fuel and residual gas. The opening times of the intake valves 7 are for this purpose displaced slightly toward "retarded."

As a result of injection of the additional fuel, the mixture reaching the exhaust manifold 6 possesses increased exhaust energy, it being manifested in particular in rise in pressure and temperature. This increased exhaust gas energy results in a better response characteristic in the lower engine speed range for the exhaust gas turbocharger 2 adjacent to the exhaust manifold 6. The increased exhaust gas energy also makes it possible for the catalytic converter 3 shown in the FIGURE adjacent to the exhaust gas turbocharger 2 to be heated more rapidly to its operating temperature and for the catalytic converter 3 to retain this temperature more efficiently. In this way sulfur contamination occurring in catalytic converters for lean-mix engines can be neutralized.

The arrows in the FIGURE indicate the direction of flow of fresh air drawn in and, accordingly, the direction of the exhaust gases expelled.

What is claimed is:

1. A process for operating an internal combustion engine, comprising of:
   delivering an additional amount of fuel with an increased exhaust gas mass flow acting temporarily on an exhaust gas stream,
   wherein the additional amount of fuel is delivered directly to a combustion chamber of the internal combustion engine during a discharge cycle with discharge valve and a plurality of valves open and the additional fuel is spark ignited.

2. The process as claimed in claim 1, wherein delivery of the additional amount of fuel takes place before a piston of the internal combustion engine reaches an upper dead center.

3. A process as claimed in claim 1, wherein the delivery of the additional amount of fuel takes place with one of an intake valve and a plurality of intake valves closed.

4. The process as claimed in claim 3, wherein an opening time for one of the intake valve and the plurality of intake valves of the internal combustion engine is displaced toward a retarded direction during the delivery of the additional amount of fuel.

5. The process as claimed in claim 1, wherein the additional fuel being delivered to the internal combustion engine during one of cold running stages, acceleration stages and a warmed-up stage under low load.

6. The process as claimed in claim 1, wherein residual gas in the combustion chamber of the internal combustion engine has one of an excess of air and additional fresh air is delivered to the exhaust gas stream immediately before delivery of the additional amount of fuel.

7. The process as claimed in claim 6, wherein an amount of additional fuel is determined based on one of an amount of residual gas, an amount of excess air in a plurality of cylinders of the internal combustion engine and an amount of additional fresh air delivered.

8. The process as claimed in claim 1, wherein ignition of a mixture of one of the additional amount of fuel, an amount of residual gas, and an additional amount of fresh air takes place inside the combustion chamber of the internal combustion engine.

9. A device for applying the process described in claim 1, wherein the additional amount of fuel is delivered by at least one injection nozzle mounted in the combustion chamber.

10. The device as claimed in claim 9, wherein at least one injection nozzle for injecting the additional amount of fuel is mounted on a cylinder-head side in the combustion chamber.

11. The device as claimed in claim 10, wherein the mixture of one of the additional amount of fuel, the amount of residual gas, and the additional amount of fresh air is spark-ignited by at least one spark plug mounted in the combustion chamber of the internal combustion engine.

12. The device as described in claim 11, wherein at least the one spark plug for external ignition of the mixture of one of the additional fuel, the amount of residual gas, and the additional amount of fresh air is mounted on the cylinder head-side in the combustion chamber.

* * * * *

UNITED STATES PATENT AND TRADEMARK OFFICE
CERTIFICATE OF CORRECTION

PATENT NO. : 6,213,088 B1
DATED : April 10, 2001
INVENTOR(S) : Alfred Ottowitz

It is certified that error appears in the above-identified patent and that said Letters Patent is hereby corrected as shown below:

<u>Column 4,</u>
Line 10, after the word "comprising" insert -- a step --
Line 18, after the word "additional" insert -- amount of --
Line 63, after the word "additional" insert -- amount of --

Signed and Sealed this

Twenty-eighth Day of May, 2002

*Attest:*

*Attesting Officer*

JAMES E. ROGAN
*Director of the United States Patent and Trademark Office*